US012133038B2

(12) United States Patent
Hua et al.

(10) Patent No.: US 12,133,038 B2
(45) Date of Patent: Oct. 29, 2024

(54) ACOUSTIC VENT AND PROTECTIVE MEMBRANE

(71) Applicant: Apple Inc., Cupertino, CA (US)

(72) Inventors: Thanh P. Hua, San Jose, CA (US); Priyanka Venkatesh, San Francisco, CA (US); Jarrett B. Lagler, San Francisco, CA (US); Jason J. LeBlanc, Oakland, CA (US); Hanchi Chen, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 99 days.

(21) Appl. No.: 17/901,751

(22) Filed: Sep. 1, 2022

(65) Prior Publication Data

US 2024/0080603 A1 Mar. 7, 2024

(51) Int. Cl.
*H04R 1/10* (2006.01)
*H04R 1/28* (2006.01)

(52) U.S. Cl.
CPC ......... *H04R 1/1016* (2013.01); *H04R 1/2823* (2013.01)

(58) Field of Classification Search
CPC ...... H04R 1/1016; H04R 1/28; H04R 1/2803; H04R 1/2807; H04R 1/2811; H04R 1/2815; H04R 1/2819; H04R 1/2823; H04R 1/2826; H04R 1/2838; H04R 1/2842; H04R 1/2846; H04R 1/2849; H04R 1/2853; H04R 1/2857; H04R 1/2861; H04R 1/2865; H04R 1/2869; H04R 1/2873; H04R 2225/025; H04R 2460/09; H04R 2460/11
See application file for complete search history.

(56) References Cited

U.S. PATENT DOCUMENTS

| | | | |
|---|---|---|---|
| 4,742,887 A | 5/1988 | Yamagishi | |
| 5,298,692 A | 3/1994 | Ikeda et al. | |
| 5,949,896 A | 9/1999 | Nageno et al. | |
| 7,634,099 B2 | 12/2009 | Harvey et al. | |
| 7,916,888 B2 | 3/2011 | Sapiejewski et al. | |
| 8,532,325 B2 | 9/2013 | Tung et al. | |
| 8,594,351 B2 | 11/2013 | Harlow et al. | |
| 8,976,994 B2 | 3/2015 | Howes et al. | |
| 9,319,767 B2 * | 4/2016 | Sakaguchi | H04R 25/48 |
| 9,883,280 B2 * | 1/2018 | Oosato | H04R 1/2857 |
| 9,900,713 B2 | 2/2018 | Pedersen et al. | |
| 10,356,510 B2 * | 7/2019 | Howes | H04R 1/1016 |
| 10,547,925 B2 | 1/2020 | Kuki et al. | |
| 10,623,847 B2 * | 4/2020 | Jiang | H04R 1/1075 |
| 11,128,964 B2 | 9/2021 | Weibel et al. | |
| 11,336,983 B1 * | 5/2022 | Ji | H04R 9/025 |

(Continued)

FOREIGN PATENT DOCUMENTS

| | | | |
|---|---|---|---|
| CN | 210405592 U | 4/2020 | |
| CN | 213126423 U * | 5/2021 | H04R 1/1016 |

(Continued)

*Primary Examiner* — Ryan Robinson
(74) *Attorney, Agent, or Firm* — Aikin & Gallant, LLP

(57) ABSTRACT

An in-ear electronic device comprising: an enclosure that defines an enclosed space surrounding a driver and an acoustic vent to an ambient environment surrounding the enclosure; and an acoustic frame having an outer surface coupled to the enclosure and defining an acoustic channel between a back volume chamber of the driver to the acoustic vent.

20 Claims, 6 Drawing Sheets

(56) References Cited

U.S. PATENT DOCUMENTS

| | | | | |
|---|---|---|---|---|
| 11,395,058 | B2 | 7/2022 | Isaacson et al. | |
| 11,653,154 | B2 | 5/2023 | Obradovic et al. | |
| 11,800,278 | B2 | 10/2023 | Christensen et al. | |
| 2007/0189570 | A1 | 8/2007 | Matsuo et al. | |
| 2008/0298623 | A1* | 12/2008 | Klein | H04R 1/2857 381/380 |
| 2009/0041281 | A1 | 2/2009 | Chang | |
| 2009/0116676 | A1 | 5/2009 | Welsh et al. | |
| 2009/0123010 | A1 | 5/2009 | Cano et al. | |
| 2009/0147981 | A1 | 6/2009 | Blanchard et al. | |
| 2011/0058704 | A1 | 3/2011 | Harlow et al. | |
| 2011/0081034 | A1 | 4/2011 | Tung et al. | |
| 2011/0189876 | A1 | 8/2011 | Schneider | |
| 2012/0076341 | A1 | 3/2012 | Ozawa | |
| 2012/0314882 | A1* | 12/2012 | Sibbald | H04R 1/1075 29/896.2 |
| 2015/0289051 | A1* | 10/2015 | Tung | H04R 1/023 381/334 |
| 2015/0312688 | A1 | 10/2015 | Karamuk et al. | |
| 2015/0382100 | A1* | 12/2015 | Azmi | H04R 1/2811 381/380 |
| 2016/0234587 | A1 | 8/2016 | Kappus et al. | |
| 2018/0167712 | A1* | 6/2018 | Lin | H04R 1/1066 |
| 2021/0099778 | A1 | 4/2021 | Hua et al. | |
| 2022/0053259 | A1* | 2/2022 | Daley | H04R 1/2826 |
| 2022/0240004 | A1 | 7/2022 | Howes et al. | |
| 2022/0315412 | A1* | 10/2022 | Liang | B81B 3/0021 |
| 2022/0329926 | A1* | 10/2022 | Han | H04R 1/2873 |
| 2023/0022584 | A1* | 1/2023 | Kelly | H04R 1/2807 |
| 2023/0109738 | A1 | 4/2023 | Geng et al. | |
| 2023/0179912 | A1* | 6/2023 | Chang | H04R 1/345 381/332 |
| 2023/0269513 | A1* | 8/2023 | Cousins | H04R 1/1083 381/171 |
| 2023/0353921 | A1* | 11/2023 | Lee | H04R 1/2811 |

FOREIGN PATENT DOCUMENTS

| | | | | | |
|---|---|---|---|---|---|
| DE | 19838391 | A1 | | 3/2000 | |
| EP | 0448110 | | | 9/1991 | |
| EP | 1879424 | | | 1/2008 | |
| EP | 3471434 | A1 | | 4/2019 | |
| EP | 3264791 | B1 | * | 8/2019 | H04R 1/1016 |
| EP | 3849206 | B1 | * | 11/2023 | H04R 1/1016 |
| GB | 2505979 | A | * | 3/2014 | G10K 11/16 |
| JP | 62141293 | | | 9/1987 | |
| JP | H08172691 | | | 7/1996 | |
| JP | 2011159626 | | | 8/2011 | |
| JP | 2011182201 | | | 9/2011 | |
| KR | 19920007601 | | | 10/1992 | |
| KR | 20210134193 | A | * | 11/2021 | |
| WO | 2006090545 | A1 | | 8/2006 | |
| WO | 2021214313 | A1 | | 10/2021 | |
| WO | 2023273963 | A1 | | 1/2023 | |
| WO | WO-2023070999 | A1 | * | 5/2023 | |

* cited by examiner

ACOUSTIC VENT AND PROTECTIVE MEMBRANE

FIELD

An aspect of the disclosure is directed to an acoustic vent and channel connecting to a driver back volume chamber of an in-ear device for passive attenuation. In another aspect, the disclosure is directed to a protective or reactive membrane for a microphone of an in-ear device. Other embodiments are also described and claimed.

BACKGROUND

Portable listening devices can be used with a wide variety of electronic devices such as portable media players, smart phones, tablet computers, laptop computers, stereo systems, and other types of devices. Portable listening devices have historically included one or more small speakers configured to be placed on, in, or near a user's ear, and include structural components that hold the speakers in place, and a cable that electrically connects the portable listening device to an audio source. Other portable listening devices can be wireless devices that do not include a cable and instead, wirelessly receive a stream of audio data from a wireless audio source. Such portable listening devices can include, for instance, wireless earbud devices or in-ear hearing devices that operate in pairs (one for each ear) or individually for outputting sound to, and receiving sound from, the user.

SUMMARY

In one aspect, the disclosure is directed to a rear vent and channel that improves passive attenuation in a portable listening device such as an earbud by acting as a low pass filter making it more difficult for high frequency sounds (e.g., sounds greater than 4 kHz) to enter. Representatively, the channel may be constructed from sidewalls of an acoustic frame and connect a rear vent in the earbud housing to a back volume chamber within the housing. In some aspects, an aspect ratio of the channel may be a slit (in cross-section) and be tuned to attenuate an undesirable range of high frequencies (e.g., frequencies greater than 4 kHz).

In another aspect, the disclosure is directed to a protective or reactive membrane that protects a microphone within a portable listening device (e.g., an earbud) from ultrasound and other contaminants. Representatively, portable listening devices such as earbuds may include a microphone, for example, an external microphone that picks up sounds from the ambient environment surrounding the device. For example, the microphone may pick up the user's voice, pick up ambient noise (e.g., for noise cancellation), or be used for other purposes. A microphone picking up sounds from the ambient environment may, however, be sensitive to undesirable ultrasonic frequencies and/or contamination from the ambient environment. For example, if left unprotected, the microphone may be subject to contamination by water and/or a detergent entering a pathway to the microphone from the ambient environment. To protect the microphone against these types of contaminants and potential acoustic negative impacts, a protective or reactive membrane may be coupled to an acoustic pathway coupling the microphone to the ambient environment. The protective or reactive membrane may be made of any material that has particular dimensions that have been found to protect the microphone without impacting a frequency response of the microphone. In some aspects, the protective or reactive membrane may be as close as possible to the microphone membrane to optimize mitigation of potential negative acoustic impacts. Protecting the microphone as disclosed herein may impact acoustic performance, for example, signal-to-noise ratio (SNR) and insertion loss. For example, the protective or reactive membrane may, in some aspects, protect the microphone from ultrasound by damping the resonances inside a channel connected to the microphone.

Representatively, in one aspect, the disclosure is directed to an in-ear electronic device including an enclosure that defines an enclosed space surrounding a driver and an acoustic vent to an ambient environment surrounding the enclosure; and an acoustic frame having an outer surface coupled to the enclosure and defining an acoustic channel between a back volume chamber of the driver to the acoustic vent. In one aspect, the outer surface of the acoustic frame includes a first sidewall and a second sidewall that define a first side and a second side, respectively, of the acoustic channel. In another aspect, the enclosure includes an inner surface that is coupled to the first sidewall and the second sidewall of the acoustic frame to enclose the acoustic channel. In another aspect, the acoustic channel includes a length dimension greater than a width dimension of the acoustic channel. In another aspect, the acoustic channel includes a width dimension greater than a height dimension of the acoustic channel. In another aspect, the acoustic channel includes at least one curved sidewall. In another aspect, the acoustic channel is tuned to attenuate frequencies greater than 4 kHz. In another aspect, the device further includes an acoustic mesh coupled to the acoustic vent. In some aspects, the enclosure includes a cap portion coupled to a body portion. In some aspects, the cap portion includes the acoustic vent and further comprises an acoustic opening coupling a front volume chamber of the driver to the ambient environment.

In still further aspects, the disclosure is directed to an in-ear electronic device including an enclosure having a cap portion defining an acoustic port and an acoustic vent open to an ambient environment, and a body portion coupled to the cap portion; a driver positioned within the cap portion and dividing the cap portion into a front volume chamber coupling a sound output face of the driver to the acoustic port and a back volume chamber; and an acoustic frame coupled to the driver and defining an acoustic channel coupling the back volume chamber of the driver to the acoustic vent for passive attenuation of a desired frequency range. In some aspects, the acoustic frame is positioned within the cap portion. In another aspect, the acoustic frame includes an outer surface having a recessed portion formed within the outer surface and a first sidewall and a second sidewall positioned on opposite sides of the recessed portion to define the acoustic channel. In another aspect, the cap portion includes an inner surface having a first mating member and a second mating member, and wherein the first mating member and the second mating member mate with the first sidewall and the second sidewall, respectively, to enclose the acoustic channel. In one aspect, the acoustic channel includes a length dimension that is at least 1.5 times a width dimension of the acoustic channel. In some aspects, the acoustic channel comprises a width dimension that is at least 2.5 times a height dimension of the acoustic channel. In some aspects, the acoustic channel includes at least one curved sidewall. In some aspects, the acoustic channel is tuned to attenuate frequencies in an ultrasonic range. In some aspects, the device further includes an acoustic mesh coupled to the acoustic vent. In some aspects, the cap portion is snap fit to the body portion.

In another aspect, the disclosure is directed to an in-ear electronic device including an enclosure that defines an enclosed space surrounding a microphone and an acoustic opening to an ambient environment surrounding the enclosure; an acoustic pathway having a first end that opens to the acoustic opening and a second end that opens to the microphone; and a protective membrane positioned between the second end of the acoustic channel and the microphone. In some aspects, the protective membrane is positioned closer to the microphone module than the acoustic opening. In another aspect, the protective membrane is configured to protect the microphone from ultrasound by damping resonances inside the acoustic channel. In still further aspets, the protective membrane is configured to protect the microphone from ingress of a contaminant. In still further aspects, the protective membrane comprises a porous polymer material. In some aspects, the protective membrane is the only protective membrane positioned between the acoustic opening and the microphone module. The protective membrane may be coupled to a microphone port of the microphone. In some aspects, the microphone may be operable to collect ambient sound from the ambient environment for an active noise cancellation application. In some aspects, the enclosure includes a cap portion that interlocks with a body portion to define the enclosed space, and wherein the acoustic opening is through the body portion. In some aspects, the cap portion is dimensioned for insertion within a user's ear.

In another aspect, an in-ear electronic device includes an enclosure having an enclosure wall that defines an interior chamber and an acoustic opening between the interior chamber and a surrounding ambient environment; a microphone positioned within the interior chamber and having a microphone port acoustically coupled to the acoustic opening; and a protective membrane coupled to the microphone port to protect the microphone. In another aspect, the protective membrane is positioned closer to the microphone than the acoustic opening. In another aspect, an acoustic channel acoustically couples the microphone port to the acoustic opening. In another aspect, the protective membrane is configured to dampen resonances inside the acoustic channel. In still further aspects, the protective membrane is configured to protect the microphone from ingress of a fluid. In another aspect, the protective membrane includes a porous polymer material. In some aspects, the protective membrane includes a surface area substantially similar to a surface area of the microphone port. In some aspects, the microphone includes a microphone operable to collect ambient sound from the ambient environment for an active noise cancellation application. In some aspects, the enclosure wall forms a cap portion dimensioned for insertion with a user's ear and a body portion coupled to the cap portion, and wherein the acoustic opening is within a portion of the enclosure wall forming the body portion. In some aspects, the body portion is an elongated portion that extends in a perpendicular direction from the cap portion.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one.

DETAILED DESCRIPTION

In this section we shall explain several preferred aspects of the disclosure with reference to the appended drawings. Whenever the shapes, relative positions and other aspects of the parts described in the aspects are not clearly defined, the scope of the disclosure is not limited only to the parts shown, which are meant merely for the purpose of illustration. Also, while numerous details are set forth, it is understood that some aspects of the disclosure may be practiced without these details. In other instances, well-known structures and techniques have not been shown in detail so as not to obscure the understanding of this description.

The terminology used herein is for the purpose of describing particular aspects only and is not intended to be limiting of the disclosure. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and/or "comprising" specify the presence of stated features, steps, operations, elements, and/or components, but do not preclude the presence or addition of one or more other features, steps, operations, elements, components, and/or groups thereof.

The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Figure 1:
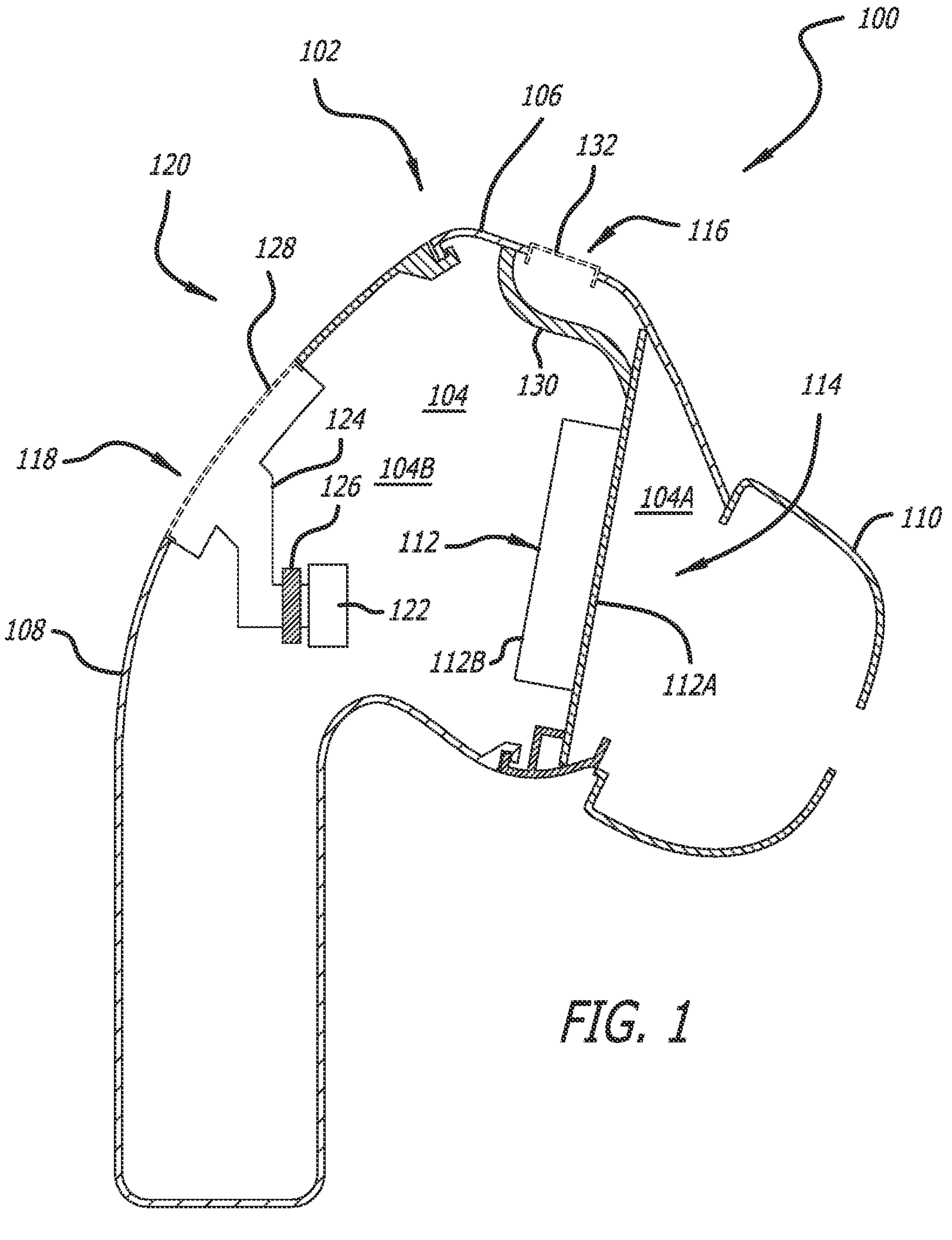
FIG. 1 illustrates a cross-sectional side view of a representative portable electronic listening device in which the aspects disclosed herein may be implemented.

FIG. 1 illustrates a perspective view of a portable electronic device within which any one or more of the aspects disclosed herein, alone or in combination, may be implemented. For example, the portable electronic device may be a portable listening device 100 such as an in-ear listening device or earbud. Device 100 may be formed by a housing or enclosure 102 having a wall that defines an enclosed space or chamber 104 within which various components of the device 100 are contained. Representatively, in one aspect, enclosure 102 may include a cap portion 106 that interlocks with a body portion 108 to form the enclosed space or chamber 104. Cap portion 106 may be considered a bud portion that is dimensioned to rest within a user's ear. Cap portion 106 may have one end configured to connect to a tip portion 110 that is dimensioned to be inserted into the user's ear and/or ear canal. Representatively, cap portion 106 may include an acoustic opening or port 114 that is open to the tip portion 110 and allows for sound output from device 100 to the user's ear. In some aspects, cap portion 106 may be dimensioned to contain a driver 112. Driver 112 may have a sound output face 112A operable to output sound to acoustic opening or port 114. For example, driver 112 may be, for example, an electroacoustic transducer that converts electrical signals to acoustic signals that are output from the sound output face 112A. A driver front volume chamber 104A connects driver sound output face 112A to port 114. Driver 112 may further include a back side or face 112B that is connected to a driver back volume chamber 104B within enclosure 102. The other end of the cap portion 106 (not connected to tip portion 110) forms part of back volume chamber 104B and may further include an acoustic vent 116. Acoustic vent 116 in combination with an acoustic frame 130 may connect back volume chamber 104B to the surrounding ambient environment 120 and provide passive attenuation of desired frequencies. For example, acoustic frame 130 may be attached to cap portion 106 and define an acoustic channel, as will be described in more detail in reference to FIGS. 4-7, that connects the back volume chamber 104B to acoustic vent 116 and provides passive attenuation. An additional membrane or mesh 132 may be connected to acoustic vent 116 to provide protection from contaminants and/or acoustic improvements. For example, mesh 132 may be an acoustic mesh that helps provide passive attenuation to the air passing through acoustic vent 116. Aspects of acoustic vent 116 and acoustic frame 130 for providing passive attenuation will be described in more detail in reference to FIGS. 4-7. Cap portion 106 may further be configured to interlock with, or otherwise connect with, body portion 108.

Body portion 108 may be a stem or elongated portion that connects with cap portion 106 at one end (e.g., interlocks) and extends from cap portion 106 to form a tube-like structure at another end. Body portion 108 may be dimensioned to contain additional aspects of the device and/or provide an acoustic pathway that enhances an acoustic performance of device 100. Representatively, in one aspect, body portion 108 may contain an acoustic opening 118 that connects a microphone 122 within body portion 108 to the ambient environment 120. Microphone 122 may be, for example, a microphone or microphone module that collects ambient sounds from ambient environment 120 for an acoustic noise control (ANC) application. In some aspects, one or more of a protective or reactive membrane 126 may be positioned at an end of an acoustic pathway 124 connecting microphone 122 to acoustic opening 118 to protect microphone 122 from ultrasonic frequencies and/or contaminants from ambient environment 120. Additional aspects of the protective membrane 126 will be described in more detail in reference to FIGS. 2-3. An additional membrane or mesh 128 may be connected to acoustic opening 118 to provide further protection and/or acoustic improvements. In some aspects, the tube like end of body portion 108 may further be dimensioned to contain other aspects including a power source and/or cables and/or wires extending to driver 112. For example, the wires may carry an audio signal that will be audibilized by the driver 112 and output through port 114. In some embodiments, the tube-like end of body portion 108 extends in a substantially perpendicular direction to cap portion 106 such that cap portion 106 is in a substantially horizontal orientation, the tube-like end of body portion 108 extends vertically downward from cap portion 106. In this aspect, when the tip portion 110 and cap portion 106 are resting within the user's ear, the body portion 108 may extend outside of the ear, for example, toward a user's face.

Figure 2:
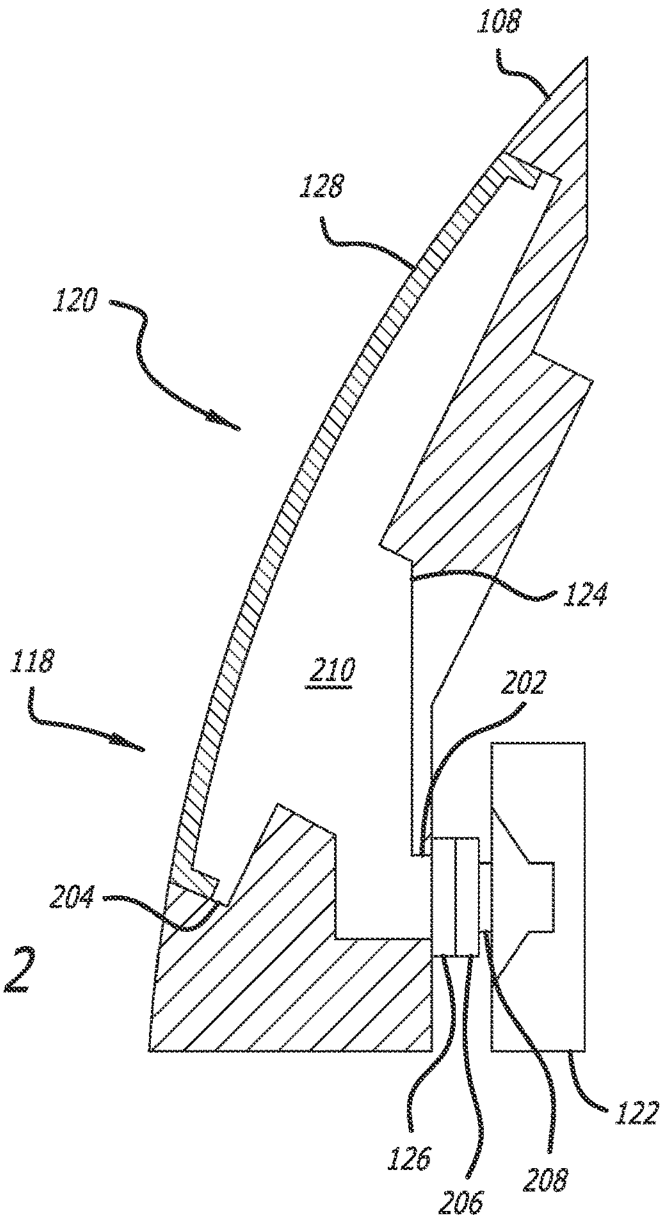
FIG. 2 illustrates a cross-sectional side view of a representative aspect of FIG. 1.

Referring now to FIG. 2, FIG. 2 is a cross-sectional side view illustrating aspects of the protective membrane and microphone assembly of FIG. 1 in more detail. Representatively, as can be seen from this view, microphone 122 is connected to acoustic opening 118 by a tortuous acoustic pathway 124. For example, tortuous acoustic pathway 124 may have one end 202 that opens to microphone 122 and another end 204 that opens to acoustic opening 118. In between the ends 202, 204, tortuous acoustic pathway 124 may have at least one or more bends, curves, turns, or the like such that it is not a straight pathway. In some aspects, the end 202 of acoustic pathway 124 nearest to microphone 122 is connected to the protective and/or reactive membrane 126. The protective and/or reactive membrane 126 may be designed to both protect and provide an improvement in acoustic performance of microphone 122. Representatively, membrane 126 may be made of any protective membrane material suitable for blocking the passage of contaminants such as liquids or detergents and preventing them from reaching microphone 122. In this aspect, if the device 100 were to accidentally be washed, or otherwise exposed to liquids or detergents, these types of contaminants would be prevented from reaching and damaging microphone 122. In addition, the membrane material may be operable to block or otherwise protect the microphone 122 from undesirable ultrasonic frequencies by damping resonances inside acoustic pathway 124. The membrane material may further be considered reactive or a material that can vibrate similar to that of a driver so that it does not negatively impact the acoustic pathway. In addition, membrane 126 may be positioned as close as possible to microphone 122 so that membrane 126 does not negatively impact the acoustic performance (e.g., signal-to-noise ratio (SNR) and/or insertion loss) and in some cases improves acoustic performance. Representatively, positioning membrane 126 as close as possible to microphone 122 has been found to provide better acoustic performance, for example, a gain in insertion loss (more transparent for acoustics) and provides less noise.

Representatively, in some aspects, membrane 126 may be considered positioned closer to microphone 122 than opening 118. For example, one side of membrane 126 may be connected to end 202 of acoustic pathway 124. The other side of membrane 126 (e.g., the side facing away from acoustic pathway 124) may be connected to a flexible circuit 206. Flexible circuit 206 may be attached to the port 208 of microphone 122 and provide electrical connections to/from microphone 122. In this aspect, the only structures between membrane 126 and microphone 122 may be the flexible circuit 206 and/or microphone port 208. In addition, in some aspects, membrane 126 may be the only membrane within the acoustic pathway 124 connecting microphone 122 to the acoustic opening 118.

Membrane 126 may further be considered different than mesh 128 formed over acoustic opening 118. For example, in contrast to the material forming membrane 126, mesh 128 may be formed of a woven material and may conform to a topography of an external surface of body portion 108. For example, mesh 128 may be attached to body portion 108, and dimensioned to completely cover acoustic opening 118. An external surface of mesh 128 may be exposed (or face) the ambient environment 120, and in some cases may be planar with the external surface of body portion 108. An internal surface of mesh 128 may be exposed, share a volume with, or otherwise face, cavity 210 defined by tortuous acoustic pathway 124.

Figure 3:
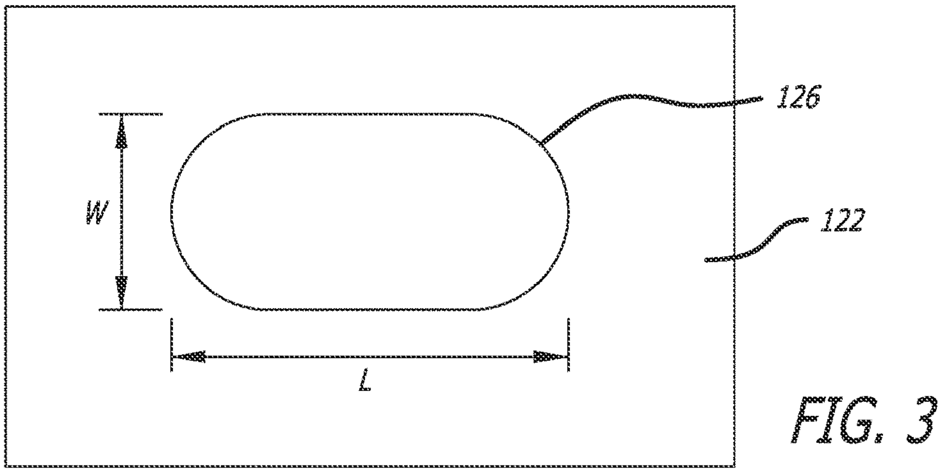
FIG. 3 illustrates a top plan view of one aspect of an aspect of FIG. 2.

Referring now to FIG. 3, FIG. 3 illustrates a schematic top plan view of membrane 126 connected to microphone 122 as described in reference to FIG. 2. From this view, it can be seen that membrane 126 may have an elongated shape and/or size. In some aspects, membrane 126 may have a size and/or shape that matches the size and/or shape of the end of the tortuous pathway 124 and/or microphone port 208208. For example, membrane 126 may have an oval or race-track shape in which the length (L) is greater than the width (W). In addition, in some aspects, a surface area of membrane 126 may be as large as possible. For example, membrane 126 may have a surface area greater than one millimeter squared, or greater than two millimeters squared. It is contemplated that the elongated shape and/or size helps to optimize the protection and/or acoustic improvement achieved by membrane 126 as previously discussed.

Figure 4:
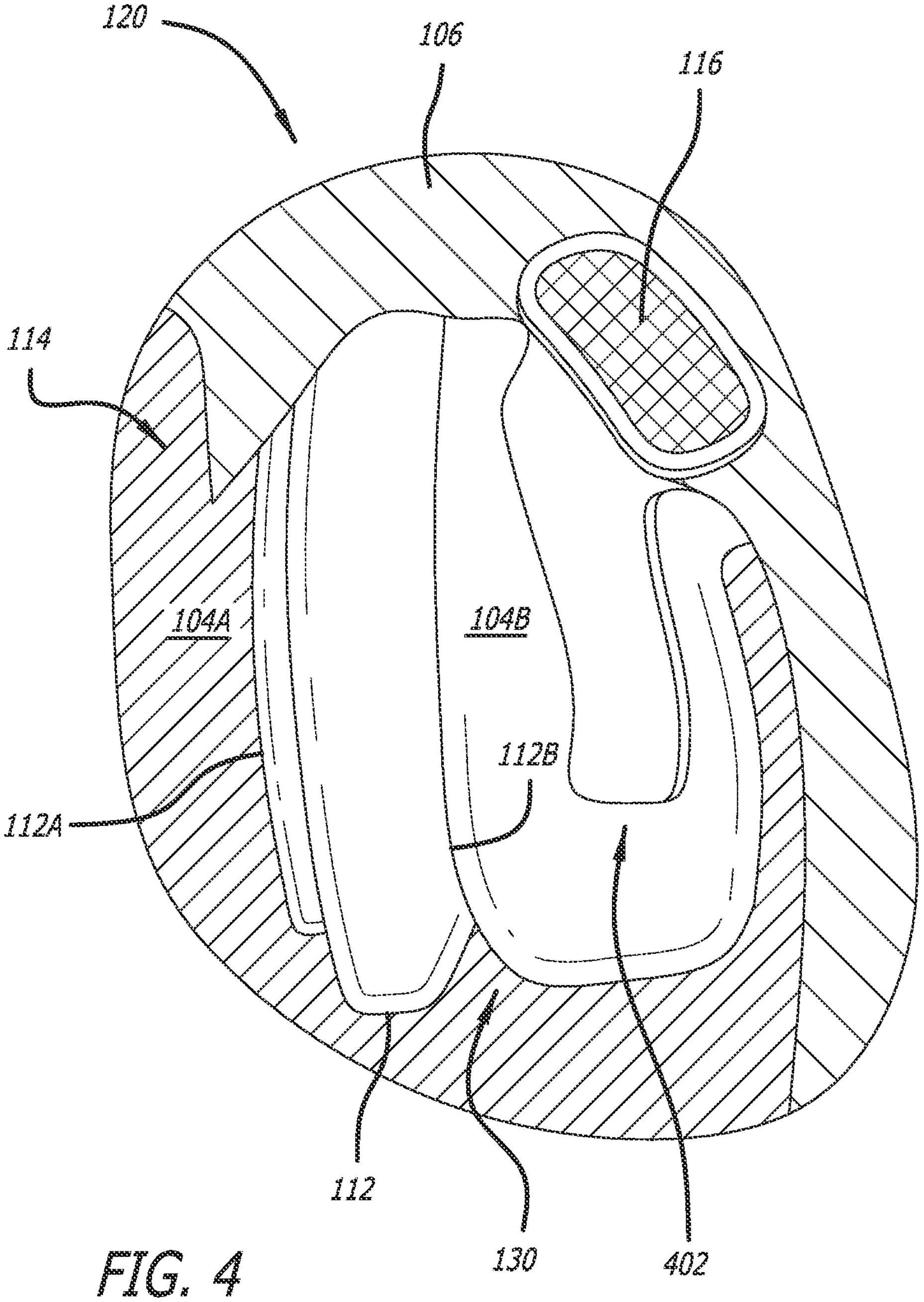
FIG. 4 illustrates a top perspective view of a representative aspect of FIG. 1.

Referring now to FIG. 4, FIG. 4 illustrates a cut out perspective view of the previously discussed acoustic vent 116 and acoustic frame 130 for providing passive attenuation, in more detail. Representatively, a portion of cap portion 106 is removed so that the positioning of acoustic frame 130 within cap portion 106 can be more clearly seen. For example, acoustic frame 130 may have an exterior or outer surface that connects, attaches, interlocks or is otherwise secured to an inner surface of cap portion 106. Acoustic frame 130 may further be connected to driver 112. For example, acoustic frame 130 may be connected to the back face 112B of driver 112 and orient driver 112 such that the front face 112A faces, or otherwise outputs sound in a direction of, the front volume chamber 104A to acoustic opening or port 114. The back volume chamber 104B of driver 112 may be understood as the area between the back face 112B of driver and surrounding an outer surface of acoustic frame 130. The outer surface of acoustic frame 130 further defines an acoustic channel 402 that is enclosed by the cap portion 106. Acoustic channel 402 is open to the acoustic vent 116 in cap portion 106 at one end. The other end of acoustic channel 402 is open to back volume chamber 104B of driver 112. In this aspect, acoustic channel 402 defines an acoustic pathway between back volume chamber 104B and the ambient environment 120 surrounding cap portion 106. Acoustic channel 402 may be dimensioned, or otherwise tuned, to provide passive attenuation of desired frequencies. For example, acoustic channel 402 may have a particular surface shape, length, width, height, thickness and/or other shape or dimension particularly selected to provide passive attenuation to high frequencies (e.g., frequencies greater than 4 kHz).

Figure 5:
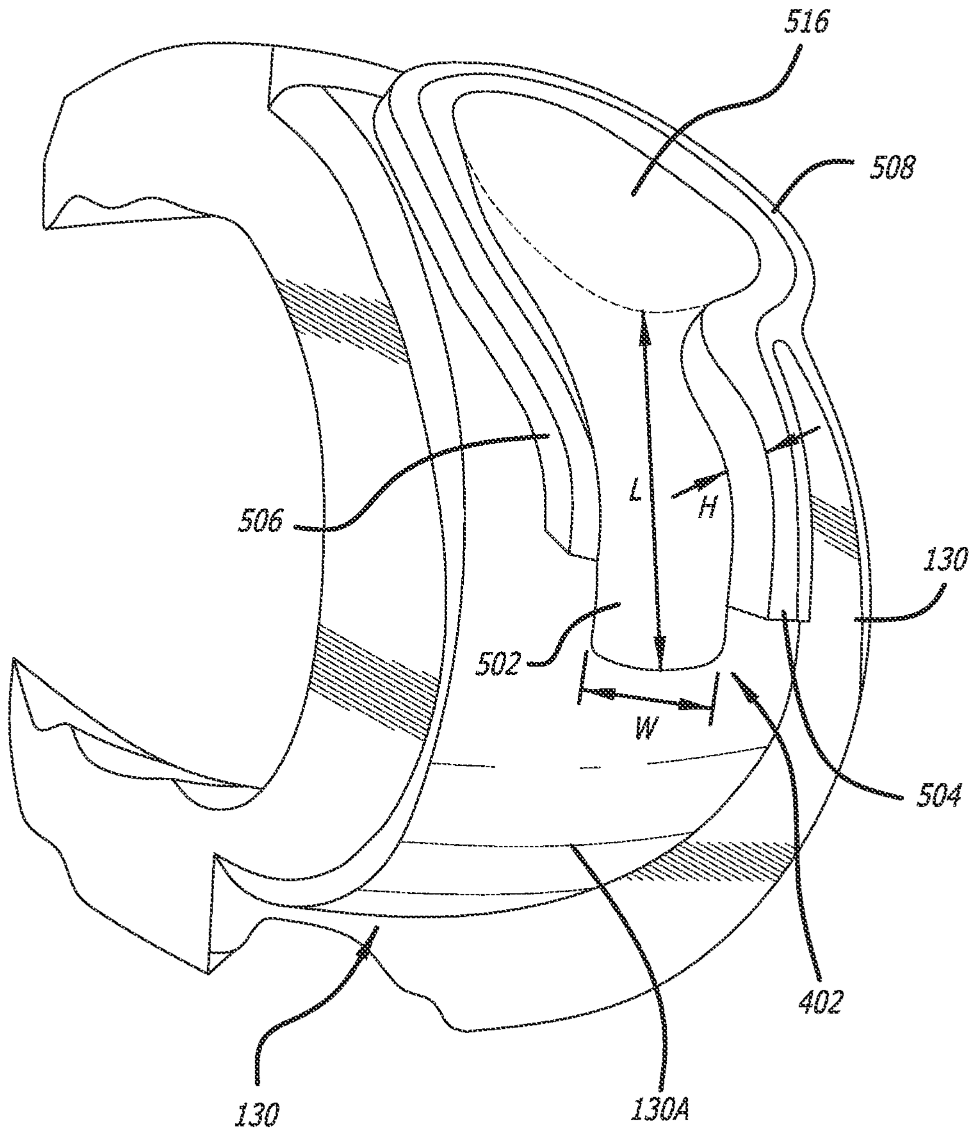
FIG. 5 illustrates a top perspective view of a representative aspect of FIG. 4.
Figure 6:
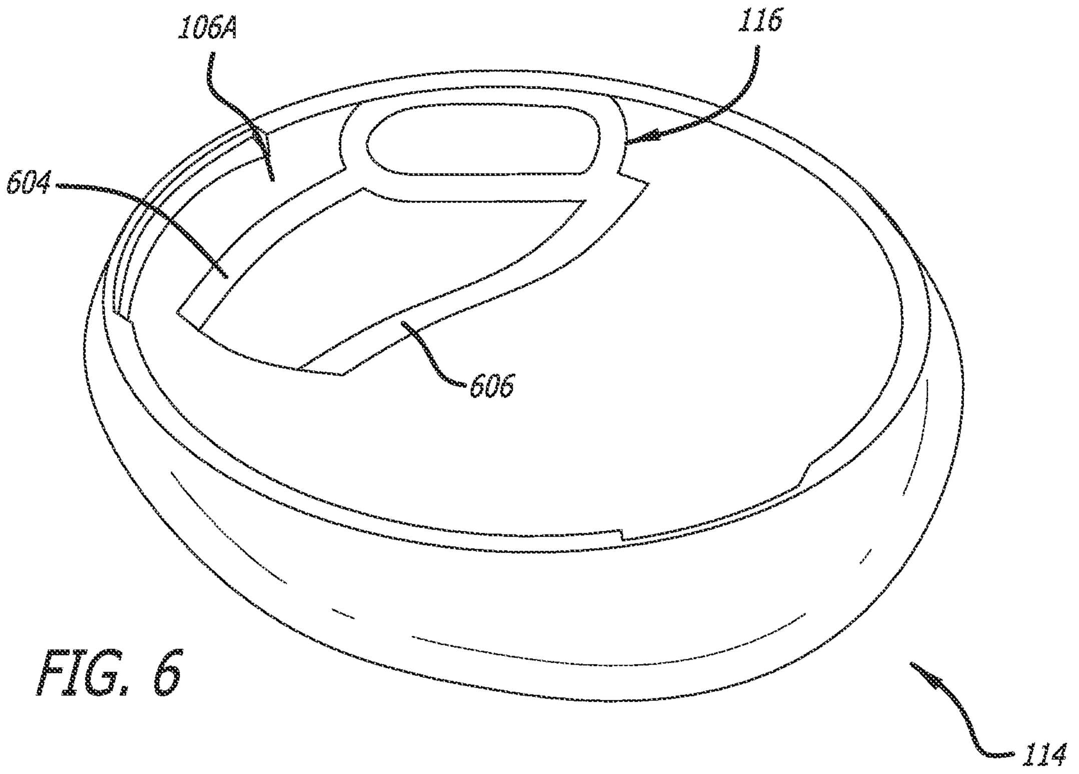
FIG. 6 illustrates a bottom perspective view of a representative aspect of FIG. 4.

Representatively, FIG. 5 illustrates a top perspective view of acoustic frame 130 of FIG. 4. The components coupled to frame 130 as previously discussed are omitted from FIG. 5 so aspects of acoustic channel 402 may be viewed more clearly. From this view, it can be seen that acoustic channel 402 is formed along an outer surface 130A of acoustic frame 130. Representatively, acoustic channel 402 may have a relatively smooth bottom surface or side 502 that conforms to a curvature of acoustic frame 130. In some aspects, the bottom surface or side 502 may be a recessed portion formed within the outer surface 130A. Sidewalls 504, 506 may further be formed by the outer surface 130A and run along the sides of bottom surface or side 502 to further define the sides of acoustic channel 402. When the acoustic frame 130 is then positioned within the cap portion 106, sidewalls 504, 506 connect to the inner surface of cap portion 106 to enclose the acoustic channel 402. Representatively, FIG. 6 illustrates a perspective view of an inner or interior surface of cap portion 106. From this view, it can be seen that the inner or interior surface 106A of cap portion 106 includes mating members 604, 606 that extend to, and around, acoustic vent 116. Mating members 604, 606 are designed to mate with, or otherwise connect to, sidewalls 504, 506 of acoustic channel 402 and sidewall 508 of enlarged portion 516. In this aspect, when acoustic frame 130 is positioned within cap portion 106, mating members 604, 606 mate with the sidewalls 504, 506, 508 to form an enclosed acoustic channel 402 extending from acoustic vent 116 to an opening at the end of sidewalls 504, 506. For example, FIG. 1 illustrates the frame 130 coupled to the inner or interior surface of the cap portion 106 to enclose the acoustic channel.

Returning now to FIG. 5, the portion of acoustic channel 402 formed by surface or side 502 and sidewalls 504, 506 may be understood as having a length (L), a width (W) and height (H) (or thickness), as shown. In some aspects, the length (L) being referred to herein may be considered a "functional" length of the channel (e.g., the portion providing the acoustic advantages) as defined by the surface 502 and sidewalls 504, 506. The width (W) may further be defined by sidewalls 504, 506 and correspond to the distance between the sidewalls 504, 506. In addition, the height (H) may correspond to the height or distance sidewalls 504, 506 extend above surface 502. The length (L), width (W) and height (H) dimensions may be particularly selected so that they form an air cavity or channel that controls the frequency being attenuated. Representatively, in some aspects, acoustic channel 402 may have a length (L) greater than the width (W). In still further aspects, the length (L) and width (W) may be greater than the height (H). Said another way, in some aspects, the height (H) may be less than the width (W), and the length (H) and the width (W) may be less than the length (L). In some aspects, it is preferred that the height (H) is relatively small compared to the width (W) and length (L) to achieve greater attenuation. For example, the aspect ratio of the acoustic channel may be tuned to act as a low pass filter making it difficult for high frequency sounds to pass and attenuate an undesirable range of high frequencies. Representatively, in some aspects, the aspect ratio may be tuned to attenuate frequencies greater than 4 kHz, or frequencies in an ultrasonic range, for example, frequencies of 20 kHz and higher, or up to about 18 MHz. For example, in one aspect, acoustic channel 402 may maintain a ratio of 0.8 height (H)×2 width (W)×3.5 length (L). In other aspects, the acoustic channel may maintain a ratio of a length (L) at least 1.5 times the width (W), or an aspect ratio of 1.5:1. In still further aspects, the acoustic channel may maintain a ratio of a width (W) at least 2.5 times a height (H), or an aspect ratio of at least 2:0.8. In this aspect, a cross-sectional shape of acoustic channel 402 may resemble that of a slit or relatively thin and elongated opening, as opposed to a round or other type of opening having a larger height.

In addition, each of the bottom surface or side 502 and sidewalls 504, 506 may extend to an enlarged portion 516 that is dimensioned to connect to the acoustic vent 116. For example, a perimeter of the enlarged portion 516 may be formed by a sidewall 508 that connects to the acoustic vent 116. Representatively, where the acoustic vent 116 has an elongated or racetrack shape as shown in FIG. 4, enlarged portion 516 and sidewalls 508 may form a similar elongated or racetrack shape that matches acoustic vent 116. In this aspect, sidewalls 508 may connect to acoustic vent 116 to acoustically connect acoustic channel 402 to acoustic vent 116. In addition, it should be understood that in some aspects, the length (L) of acoustic channel 402 that is tuned for passive attenuation (e.g., the functional length) may be the portion of acoustic channel 402 extending to enlarged portion 516, but not including the dimensions of enlarged portion 516.

Figure 7:
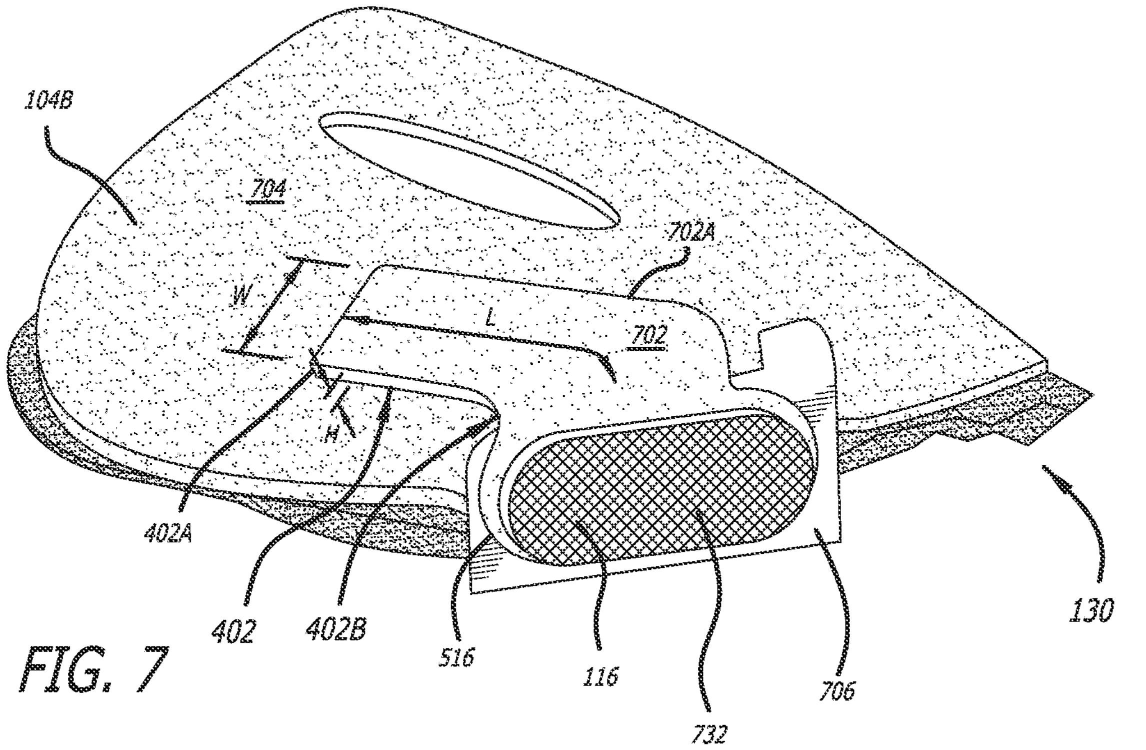
FIG. 7 illustrates a top perspective view of a representative aspect of FIG. 4.

Still further, in some aspects, bottom surface or side 502 and sidewalls 504, 506 defining the length (L) of acoustic channel 402 may have a relatively smooth and/or curved surface matching that of bottom surface or side 502. The curved or smooth surfaces and sides defining acoustic channel 402 may be tuned to improve acoustic airflow and reduce "choking". Representatively, FIG. 7 illustrates the smooth and/or curved air channel defined by the smooth and/or curved surfaces defining acoustic channel 402. From this view, it can be seen that due to the smooth and/or curved surfaces of acoustic channel 402, the air channel 702 formed by acoustic channel 402 is also relatively smooth and/or curved. For example, this view shows that at least the side 702A of air channel 702 extending from the opening 402A at one end of acoustic channel 402 to the opening 402B at the other end of acoustic channel 402 is smooth and/or curved, or otherwise does not have any abrupt angles or edges. It is contemplated that at least one side 702A, or the entire air channel 702, may be smooth and/or curved and/or free of any edges. It should further be understood that the at least one side 702A, or any other portion of air channel 702, may be curved due to the smoothness or curvature of the corresponding sidewalls 504, 506 and/or bottom surface or side 502 forming the air channel.

It can further be understood from this view that opening 402A of acoustic channel 402 is open to a rear air volume 704 within back volume chamber 104B surrounding acoustic frame 130. Rear air volume 704 may be the volume of air within the back volume chamber 104B formed between the acoustic frame 130 and the cap (e.g., cap portion 106) surrounding the acoustic frame 130. In this aspect, the air channel 702 (and acoustic channel 402) connects to the rear air volume 704 through opening 402A. In addition, opening 402B at the other end of acoustic channel 402 opens to enlarged portion 516 coupled to vent 116. In this aspect, air channel 702 (and acoustic channel 402) connects to the ambient environment 120 through opening 402B to acoustic vent 116. In still further aspects, the additional membrane or mesh 732 may be connected to acoustic vent 116 to provide protection from contaminants and/or acoustic improvements, as previously discussed. For example, mesh 732 may be an acoustic mesh that helps provide passive attenuation to the air passing through acoustic vent 116. In some aspects, mesh 732 may be coupled to acoustic vent 116 by support member 706 (e.g., a steel support member).

Figure 8:
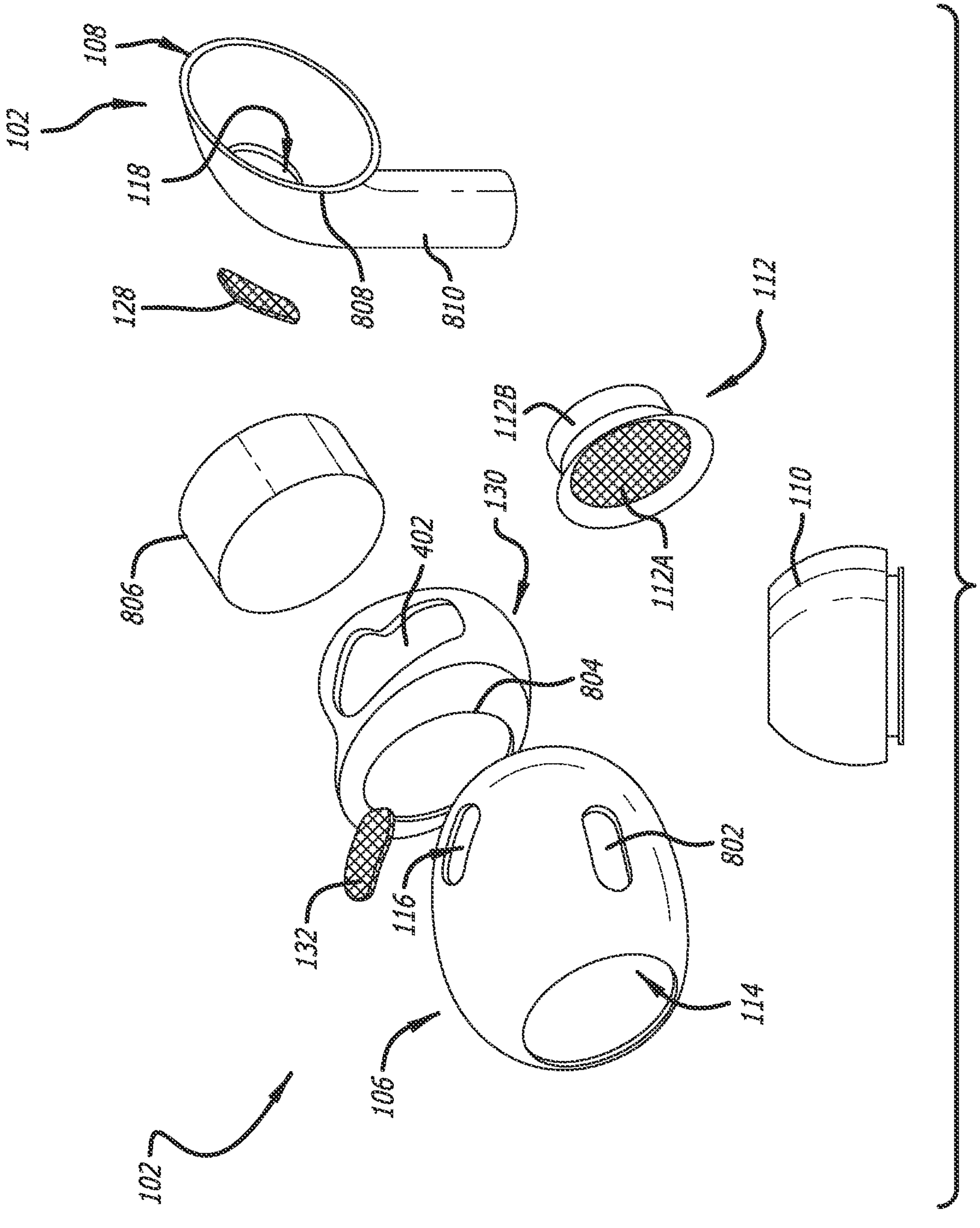
FIG. 8 illustrates an exploded perspective view of the internal acoustic components that can be contained within one embodiment of a representative portable electronic listening device housing.

FIG. 8 illustrates an exploded perspective view of a representative device housing and the internal acoustic components that can be contained therein. Representatively, the device may be an earphone including an enclosure or housing 102 that encloses the internal acoustic components. The enclosure or housing 102 may be formed by cap portion 106 and body portion 108. In the illustrated view, cap portion 106 is shown removed from body portion 108. It should be understood, however, that cap portion 106 and body portion 108 may be attached or otherwise connected to one another (e.g., snap fit) to form the enclosed space within which the internal acoustic components may be contained. Cap portion 106 and body portion 108 may be separate molded structures that are snap fit, or otherwise connected together, during assembly. In some aspects, cap portion 106 and body portion 108 may be made of a same rigid material such as plastic, or may be made of different materials.

Cap portion 106 may include acoustic opening or port 114 that is open to the tip portion 110 (when assembled) and allows for sound output from housing 102 to the user's ear. In some aspects, tip portion 110 may be snap fit or otherwise connected around the opening or port 114 of cap portion 106. Cap portion 106 may be, for example, a molded structure (e.g., a substantially rigid material such as plastic) and tip portion 110 may be made of a different more compliant material (e.g., a compliant polymeric material) that is more comfortable when inserted within the ear. In other aspects, cap portion 106 and tip portion 110 may be made of a same material.

Cap portion 106 may further include acoustic vent 116 that connects an interior chamber (e.g., back volume chamber 104B) of the housing 102 to the surrounding ambient environment, as previously discussed. In addition, cap portion 106 may include another acoustic vent 802 connecting an interior chamber or pathway of housing 102 to the surrounding ambient environment. For example, in some aspects, acoustic vent 802 may be acoustically connected to a chamber or pathway coupled to an error microphone within housing 102. In some aspects, acoustic vent 116 and acoustic vent 802 may be formed in different areas of cap portion 106 such that they face different directions.

It can further be seen from this view that acoustic frame 130 and driver 112 are coupled to cap portion 106 when assembled. Representatively, driver 112 is positioned within acoustic frame 130 such that the driver sound output face 112A is exposed through driver opening 804 of acoustic frame 130. The back side or face 112B of driver 112 faces the opposite direction and is connected to the driver back volume chamber (e.g., chamber 104B) formed between acoustic frame 130 and cap portion 106, as previously discussed. It can further be understood from this view that when acoustic frame 130 is inserted within cap portion 106, acoustic channel 402 formed on the outer surface of acoustic frame 130 is enclosed by cap portion 106 and provides an acoustic pathway between the back volume chamber and the acoustic vent 116. In still further aspects, a battery 806 may be connected to acoustic frame 130, for example positioned behind the back side or face 112B of driver 112. Inserting acoustic frame 130 within cap portion may therefore also connect battery 806 to the cap portion 106.

Referring now to body portion 108, body portion 108 may include a first portion 808 that connects to cap portion 106 and a second portion 810. First portion 808 may include acoustic opening 118 that connects a microphone (e.g., microphone 122) within body portion 108 to the ambient environment, as previously discussed. In addition, an additional membrane or mesh 128 may be connected to acoustic opening 118 to provide further protection and/or acoustic improvements, as previously discussed.

The second portion 810 may be an elongated tube or stem portion that extends from first portion 808. In some aspects, second portion 810 may be dimensioned to contain cables and/or wires extending from a power source (not shown) to the driver. For example, the wires may carry an audio signal that will be audibilized by the driver. In addition, second portion 810 may be dimensioned to provide an acoustic pathway that enhances an acoustic performance of the device. In some embodiments, second portion 810 may extend from first portion 808 in a substantially perpendicular direction such that when first portion 808 is in a substantially horizontal orientation, second portion 810 extends vertically downward from first portion 808.

It should further be understood that while each of the aspects shown in FIGS. 1-8 are described and/or illustrated in combination herein for achieving various acoustic improvements and/or benefits, any one or more of the aspects shown may be used alone or separately to achieve the descried acoustic improvement and/or benefit disclosed herein. For example, it should be understood that the acoustic improvements and/or benefits achieved by the acoustic opening 118 that connects a microphone 122 within body portion 108 to the ambient environment 120 and the protective or reactive membrane 126 do not require other previously described aspects such as the acoustic frame 130 and channel 402. In other words, acoustic frame 130 and channel 402 could be omitted and the previously discussed acoustic improvements and/or benefits achieved by the acoustic opening 118 and the protective or reactive mesh or membrane 126 would still be achieved. Similarly, the acoustic improvements and/or benefits achieved by the acoustic frame 130 and channel 402 are achieved regardless of the presence or absence of opening 118 and membrane 126. Thus, any one or more of the aspects described or shown in the drawings herein may be optional and/or otherwise omitted depending on the acoustic improvement desired.

While certain aspects have been described and shown in the accompanying drawings, it is to be understood that such embodiments are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting. In addition, to aid the Patent Office and any readers of any patent issued on this application in interpreting the claims appended hereto, applicants wish to note that they do not intend any of the appended claims or claim elements to invoke 35 U.S.C. 112(f) unless the words “means for” or “step for” are explicitly used in the particular claim.

The invention claimed is:

1. An in-ear electronic device comprising:

an enclosure that defines an enclosed space surrounding a driver and an acoustic vent to an ambient environment surrounding the enclosure; and an acoustic frame having an outer surface comprising a first sidewall and a second sidewall coupled to the enclosure and defining an acoustic channel between a back volume chamber of the driver to the acoustic vent.

2. The in-ear electronic device of claim 1 wherein the first sidewall and the second sidewall define a first side and a second side, respectively, of the acoustic channel.

3. The in-ear electronic device of claim 2 wherein the enclosure comprises an inner surface that is coupled to the first sidewall and the second sidewall of the acoustic frame to enclose the acoustic channel.

4. The in-ear electronic device of claim 1 wherein the acoustic channel comprises a length dimension greater than a width dimension of the acoustic channel.

5. The in-ear electronic device of claim 1 wherein the acoustic channel comprises a width dimension greater than a height dimension of the acoustic channel.

6. The in-ear electronic device of claim 1 wherein the acoustic channel comprises at least one curved sidewall.

7. The in-ear electronic device of claim 1 wherein the acoustic channel is tuned to attenuate frequencies greater than 4 kHz.

8. The in-ear electronic device of claim 1 further comprising an acoustic mesh coupled to the acoustic vent.

9. The in-ear electronic device of claim 1 wherein the enclosure comprises a cap portion coupled to a body portion.

10. The in-ear electronic device of claim 9 wherein the cap portion comprises the acoustic vent and further comprises an acoustic opening coupling a front volume chamber of the driver to the ambient environment.

11. An in-ear electronic device comprising:

an enclosure having a cap portion defining an acoustic port and an acoustic vent open to an ambient environment, and a body portion coupled to the cap portion;

a driver positioned within the cap portion and dividing the cap portion into a front volume chamber coupling a sound output face of the driver to the acoustic port and a back volume chamber; and an acoustic frame coupled to the driver and having an outer surface defining an acoustic channel between the outer surface and an inner surface of the enclosure that couples the back volume chamber of the driver to the acoustic vent for passive attenuation of a desired frequency range.

12. The in-ear electronic device of claim 11 wherein the acoustic frame is positioned within the cap portion.

13. The in-ear electronic device of claim 11 wherein the outer surface comprises a recessed portion formed within the outer surface and a first sidewall and a second sidewall positioned on opposite sides of the recessed portion to define the acoustic channel.

14. The in-ear electronic device of claim 13 wherein the cap portion comprises the inner surface and has a first mating member and a second mating member, and wherein the first mating member and the second mating member mate with the first sidewall and the second sidewall, respectively, to enclose the acoustic channel.

15. The in-ear electronic device of claim 11 wherein the acoustic channel comprises a length dimension that is at least 1.5 times a width dimension of the acoustic channel.

16. The in-ear electronic device of claim 11 wherein the acoustic channel comprises a width dimension that is at least 2.5 times a height dimension of the acoustic channel.

17. The in-ear electronic device of claim 11 wherein the acoustic channel comprises at least one curved sidewall.

18. The in-ear electronic device of claim 11 wherein the acoustic channel is tuned to attenuate frequencies in an ultrasonic range.

19. The in-ear electronic device of claim 11 further comprising an acoustic mesh coupled to the acoustic vent.

20. The in-ear electronic device of claim 11 wherein the cap portion is snap fit to the body portion.

* * * * *